March 18, 1952  V. J. FANTOZZI ET AL  2,589,357
DIAMOND TYPE TOOTH FOR ROTARY STONE CUTTING SAWS
Filed April 13, 1949
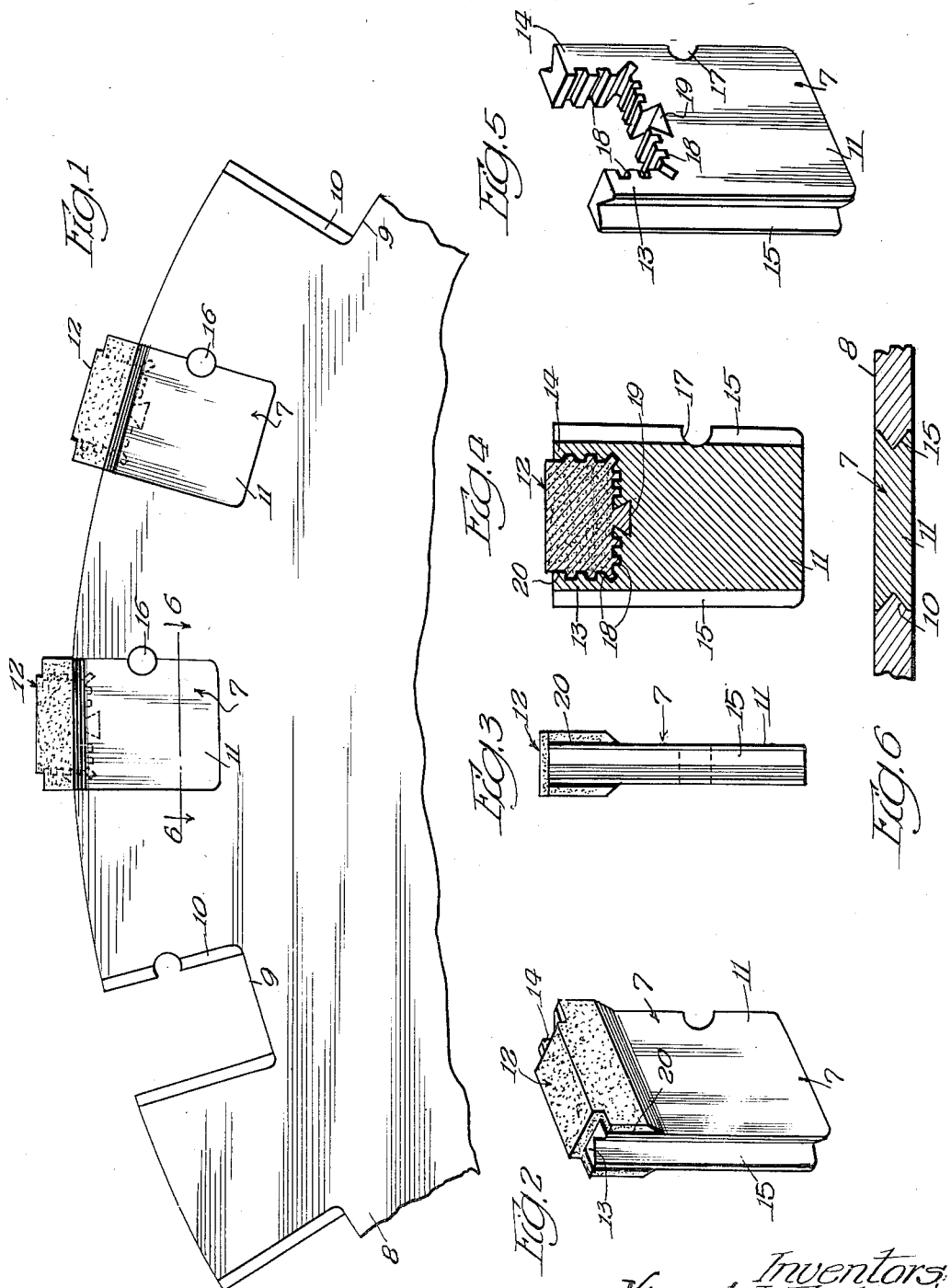
Inventors,
Vincent J. Fantozzi &
Leopold H. Metzger
By: Fred Gerlach, atty Patented Mar. 18, 1952

2,589,357

UNITED STATES PATENT OFFICE 2,589,357

DIAMOND TYPE TOOTH FOR ROTARY STONE CUTTING SAWS

Vincent J. Fantozzi and Leopold H. Metzger, Chicago, Ill., assignors to Super-Cut, Inc., Chicago, Ill., a corporation of Illinois Application April 13, 1949, Serial No. 87,264

5 Claims. (Cl. 125—15)

The present invention relates generally to teeth for use as parts of saws. More particularly the invention relates to that type of tooth which is adapted, with like or similar teeth, to be arranged in an annular series around the outer margin of a disc-like blade, forms with the other teeth and the blade a rotary saw for cutting stone, such, for example, as limestone, marble and granite and comprises a flat rectangular body which is formed of suitable metal, fits within a rectangular notch in the outer margin of the disc-like blade, embodies coacting groove and rib connections at its front and rear side margins for holding it against lateral displacement while at the same time permitting it to be removed by outward sliding movement, and has at its outer end a cutting part which is bonded in place and consists of a metallic matrix with diamonds therein.

In using a rotary stone cutting saw the stone and saw are moved relatively to one another and a liquid coolant is discharged so as to effect cooling and cleaning of the teeth as they pass successively through the stone. In practice it has been found that prior art saw teeth are subject to certain objections and require frequent replacement. If the first place the impact and pressure to which the leading ends of the cutting parts of the teeth are subjected is sometimes so great that it breaks the bond between the cutting parts and the teeth bodies with the result that the cutting parts become dislodged and sometimes in connection with outward flinging by centrifugal force cause material damage or injury. Secondly, the leading ends of the cutting parts, because they are exposed, are subjected to the abrading action of the sludge consisting of the cut stone particles and the liquid coolant and hence quickly become undercut or worn away so far as their front and side portions are concerned.

One object of the invention is to provide a diamond saw tooth which is an improvement upon, and obviates the objections to, standard or conventional teeth and is characterized by materially longer life and better, smoother and quieter operation. Generally speaking, the improved tooth embodies at the outer corners of its body outwardly extending, spaced apart metallic lugs which define with the outer margin of the body a U-shaped frame or socket-like seat in which is mounted the cutting part consisting of the metallic matrix with crushed or fragmented diamond distributed throughout. The leading lug, i. e., the lug on the front outer corner of the body has a twofold purpose in that it not only serves to absorb the shock which is normally transmitted to the leading end of the cutting part and tends to dislodge such part from its bonded relation with the outer end of the body, but also forms a barrier for protecting the leading end of the cutting part from the abrading action of the sludge, thereby preventing undercutting or rapid wearing away of the front and side portions of the leading end of the cutting part. The trailing lug, i. e., the lug on the rear outer corner of the body, coacts with the front lug positively to lock or hold the cutting part in place and also assists in resisting impact and pressure on the cutting part.

Another object of the invention is to provide a diamond type saw tooth in which the outwardly extending lugs on the body are formed of such metal that when the tooth is used in connection with the cutting of a particular type of stone the rate of wear of the lugs is approximately the same as that of the crushed or fragmented diamonds in the cutting part. In this connection it is to be understood that soft stone, like sandstone, has a greater abrading action than hard stone, such as granite. This invention contemplates when the tooth is used to cut comparatively soft stone, forming the lugs of any hard wear resistant metal, such as steel, and when the tooth is used to cut hard stone forming the lugs of softer, less wear resistant metal, such, for example as, red bronze. By forming the lugs of the proper metal for a particuular type of stone it is possible so to correlate the rate of wear of the lugs with the rate of wear of the diamonds that the lugs and cutting part wear uniformly. By having the lugs and cutting part wear uniformly in connection with cutting of stone of a particular type the tooth lasts longer and cuts more efficiently. It is here contemplated that the correlation of the rate of wear of the lugs and the rate of wear of the cutting part means that the lugs will wear away correspondingly to the cutting part to the end that the outer and side portions of the cutting part are always exposed for purposes of cutting.

Another object of the invention is to provide a saw tooth of the type and character under consideration in which the matrix of the cutting part is formed of sintered metal powder, the cutting part after application of solder to the inner side surfaces of the lugs and the outer end surface of the body is molded in place with respect to the body while the metallic particles are subjected to a sintering temperature and proper pressure, and the aforementioned surfaces are transversely notched in order to increase the area of the solder variety bond between the cutting part and such surfaces.

A further object of the invention is to provide a saw tooth of the last mentioned character in which the upper portion of the cutting part projects outwards of the outer ends of the lugs, and the side portions of the cutting part project outwards of the sides of the lugs and have end extensions in lapped and bonded relation with the sides of the lugs.

A still further object of the invention is to provide a saw tooth which is generally of new and improved construction and not only possesses long life and high wear characteristics, but also is capable of being produced at a comparatively low cost.

Other objects of the invention and the various advantages and characteristics of the present diamond type saw tooth will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a fragmentary side elevation of a rotary stone cutting saw having applied to the outer margin of the disc-like blade thereof a tooth embodying the invention;

Figure 2 is a perspective of the tooth;

Figure 3 is an end view;

Figure 4 is a vertical longitudinal section illustrating in detail the construction and design of the outwardly extending lugs on the outer corners of the body of the tooth and showing the manner in which the cutting part is interlocked with, and bonded to, the inner side surfaces of the lugs and the outer end surface of the body;

Figure 5 is a perspective of the lug equipped body before formation thereon of the cutting part consisting of the metallic matrix with crushed or fragmented diamonds distributed throughout; and Figure 6 is a section taken on the line 6—6 of Figure 1 and illustrating the manner in which the tooth is slidably connected to the saw blade by coacting or interfitting groove and rib connections at its front and rear side margins of the body.

The tooth which is shown in the drawing constitutes the preferred form or embodiment of the invention. It is designated generally by the reference numeral 7 and is adapted in connection with like or similar teeth and a disc-like blade 8 to form a rotary saw for cutting stone. As shown in Figure 1, the blade 8 has in its outer margin an annular series of equidistantly spaced, substantially rectangular notches 9 in which the teeth are mounted. The portions of the outer margin of the blade that define the sides of the notches 9 are double bevelled in order to form inwardly extending ribs 10 of V-shaped cross section. The tooth 7 consists of a body 11 and an outer cutting part 12.

The body 11 of the tooth 7 is formed of metal. It is shaped conformably to, and fits within, its particular notch 9 in the outer margin of the disc-like blade of the saw. As shown in the drawing the body of the tooth is no greater in thickness than the blade and is arranged in transversely centered relation with respect to the sides of the blade. At its front outer corner the body 11 is provided with an integral outwardly extending leading lug 13 and at its rear outer corner the body is provided with an integral outwardly extending trailing lug 14. These two lugs are the same in length and form with the outer end or margin of the body 11 a U-shaped frame or socket-like seat in which the cutting part 12 of the tooth 7 is mounted, as described hereafter. The sides of the frame forming lugs 13 and 14 and the sides of the body are preferably but not necessarily flush or coplanar. When the tooth 7 is in its operative position within its particular notch in the outer margin of the disc-like blade of the saw the lugs 13 and 14, as shown in Figure 1, project beyond the periphery of the blade. The front and rear side margins of the tooth body 11 have formed therein longitudinally extending grooves 15 of V-shaped cross section. These grooves are shaped to receive and interlock with the ribs 10 and permit the tooth 7 to be slid longitudinally into and out of its particular notch 9. The lugs 13 and 14 have continuations of the grooves 15 in order to facilitate machine forming of the grooves. The body 11 of the tooth 7 is removably secured in place by a key type rivet 16. The latter extends through a circular hole 17, half of which is formed in the central portion of the rear side margin of the tooth body and the other half of which is formed in the adjacent portion of the outer margin of the saw blade 8. The inner surfaces of the lugs 13 and 14 and the outer end surface of the body 11 have transversely extending notches 18 and these are for a purpose to be described more in detail hereafter. Preferably the notches 18 are formed in the aforementioned surfaces by a suitable saw. As best shown in Figure 4 of the drawing, one of the notches in the outer end surface of the body 11 is larger than the other notches. It is designated by the reference numeral 19 and is of dovetail configuration to the end that it has a restricted entrance. All of the notches are open ended.

The cutting part 12 of the tooth 7 fits for the most part within, and is bonded by a solder coating 20 to, the U-shaped frame that is formed by the lugs 13 and 14 and the outer end margin of the tooth body 11. It consists of a metallic matrix and crushed or fragmented diamonds distributed substantially throughout the matrix. The matrix is molded into place by the use of a suitable properly shaped mold (not shown) and consists of sintered metal powder. In practice it has been found that satisfactory results are obtained when the matrix for the crushed or fragmented diamonds is formed by mixing together and then sintering in connection with the molding operation, iron, copper, tin and nickel. The percentages by weight are iron 26, copper 26, tin 24 and nickel 24. As shown in Figures 2 and 3, the cutting part 12 is thicker than the body 11 and hence the sides of the cutting part project outwards of the sides of the tooth body. The outer portion of the cutting part projects a small distance beyond the outer ends of the lugs 13 and 14. The ends of the sides of the cutting part 12 are extended so as to lap and cover the side surfaces of the lugs. The end extensions of the sides of the cutting part are bonded to the side surfaces of the lugs 13 and 14 by a coating of solder. Preferably the solder which is used for bonding in place the cutting part 12 is a silver solder which is known commercially as "Easy-Flow #3." The lower or innermost portions of the sides of the cutting part are downwardly extended into lapped relation with the outer end portions of the sides of the tooth body 11. They are bevelled, as clearly shown in Figures 2 and 3, and are bonded in place by a silver solder coating or film. The diamond particles are intimately mixed with the metal powder before molding and sintering of the matrix and may extend throughout the entire cutting part or throughout substantially all portions with the exception of the bevelled lower side portions which lap and are bonded to the outer end portions of the sides of the body. In forming the tooth 7 the aforementioned silver solder is applied to the proper surfaces of the lugs 13 and 14 and the body 11. Thereafter the lug equipped body is inserted into a mold having a cavity which is shaped like the cutting part 12. After insertion of the body into the mold the cavity is filled with the matrix forming metal powder having the crushed diamonds or diamond particles intermixed therewith. Thereafter the charged mold is subjected to such heat and pressure as to cause melting of the solder and sintering of the metallic powder. Upon cooling of the tooth the cutting part 12 is rigid and in firm bonded relation with the body. In connection with formation of the cutting part parts of the diamond impregnated matrix forming material flow into the notches 18. After the sintering operation such parts become interlocked with the notches and thus connect the cutting part to the lugs 13 and 14 and the body 11. The part of the matrix forming material that flows into the enlarged restricted entrance notch 19 forms a positive interlocking connection between the cutting part and the outer end of the tooth body.

The mesh size of the crushed or fragmented diamonds which extend substantially throughout the metallic matrix of the cutting part is determined by the type of stone which is to be cut by the tooth. If the stone is comparatively soft, like sandstone, diamond particles having a mesh size of from 8 to 40 may be employed. If the stone to be cut is marble, diamonds having a mesh size of from 20 to 80 may be employed. If the stone to be cut is extremely hard, like granite, for example, diamonds having a mesh size of from 40 to 120 may be used.

The leading lug 13 on the front outer corner of the tooth body 11, in addition to forming with the trailing lug 14 and the outer end of the tooth body a U-shaped frame or rocket-like seat for the cutting part 12, has a twofold purpose. In the first place it serves in connection with a stone cutting operation to absorb the shock which is normally transmitted to the leading end of the cutting part 12 and tends to dislodge such part from bonded relation with the outer end of the body. Secondly, it forms a barrier for protecting the leading end of the cutting part from the abrading action of the sludge consisting of the cut stone particles and the liquid coolant. By forming such a barrier the lug 13 prevents undercutting or rapid wearing away of the front and side portions of the leading end of the cutting part. The trailing lug 14 coacts with the front or leading lug 13 positively to lock or hold the cutting part 12 in place and also assists in resisting impact and pressure on the cutting part.

When the tooth 7 is used to cut sandstone or any other comparatively soft stone having a high degree of tooth abrading action when cut, the lugs 13 and 14 and the body 11 are formed of hard, wear resistant metal, such, for example, as any of the austenitic work hardening stainless steels. When the tooth is used to cut harder stone having a less abrading action, such, for example, as marble, the lugs and body of the tooth are formed of a less hard metal, such, for example, as SAE 1020 cold rolled steel. When the tooth is used to cut an extremely hard stone having a still less degree of abrading action, such, for example, as granite, the lugs and body of the tooth are formed of a still softer metal, such, for example, as 85-5-5-5 red bronze. It is contemplated that depending upon the type of stone to be cut the lugs and body will be formed of a metal having substantially the same rate of wear as the crushed or fragmented diamonds in the cutting part 12. This results in the lugs and cutting part wearing uniformly when cutting stone of a particular type.

The herein described diamond type saw tooth, due to the fact that it includes the lugs 13 and 14, has extremely long life and is essentially smooth and quiet in operation. It is capable of being produced at a comparatively low cost and, due to its specific design and construction, is not likely to have its cutting part dislodged from its body.

Whereas the tooth has been described as being used in connection with a saw for cutting stone it is to be understood that the saw that utilizes the tooth may be used to cut any other material. It is also to be understood that the invention is not to be restricted to the details set forth since these may be modified within the scope of the appended claims without departing from the spirit and scope of the invention.

Having thus described the invention what we claim as new and desire to secure by Letters Patent is:

1. As a part of a rotary saw of the type that is adapted to cut stone and embodies a comparatively large flat sided disc-like blade with a substantially rectangular radially extending notch in its outer margin; a tooth comprising a substantially flat metallic body of no greater thickness than the blade, shaped conformably to, and fitting within the notch, arranged so that it is transversely centered with respect to the sides of the blade, having the outer end surface thereof terminating directly adjacent the outer edge of said blade, and having connected to its leading outer corner or edge portion an outwardly extending exposed comparatively short metallic lug which defines with said outer end surface of the body an elongated open top and open sided seat directly outwards of the outer edge of the blade and which is of less dimension from front to back than the seat is long, and an elongated completely solid block-like cutting part consisting of a metallic matrix and crushed or fragmented diamond particles distributed uniformly throughout the entire matrix, fitting in and extending lengthwise of the seat and having the inner portion thereof fitting against and bonded directly to said outer end surface of the body and its front end abutting against the back of the lug, said cutting part being of greater height than the seat is deep in order that its outer portion projects outwards of the outer end of the lug and exposes diamond particles for cutting purposes and being of greater thickness than the lug and the body and arranged so that its side portions project outwards of the sides of said lug and body and expose diamond particles for cutting purposes, said lug being adapted during operation of the saw to absorb shock resulting from contact with the work and tending to dislodge the cutting part from its seat and also to form a barrier for protecting the front end of said cutting part from being undercut and rapidly worn away by sludge.

2. As a part of a rotary saw of the type that is adapted to cut stone and embodies a comparatively large flat sided disc-like blade with a substantially rectangular radially extending notch in its outer margin; a tooth comprising a substantially flat metallic body of the same thickness as the blade, shaped conformably to and fitting within the notch, arrange so that its sides are flush with the sides of the blade, having the outer end surface thereof terminating directly adjacent the outer edge of the blade, and provided at its outer corner or edge portions with a pair of laterally spaced outwardly extending exposed comparatively short integral metallic lugs which define with said outer end surface of the body an elongated open top and open sided socket-like seat outwards of the outer edge of the blade and which are each of less dimension from front to back than the seat is long, and a single elongated completely solid block-like cutting part consisting of a sintered metal matrix and crushed or fragmented diamond particles distributed uniformly throughout the entire matrix, fitting in and extending lengthwise of the seat, and having the bottom portion thereof fitting against and bonded directly to, said outer end surface of the body and its ends fitting against and bonded directly to the inner opposed surfaces of the lugs, said cutting part being of greater height than the seat is deep in order that its outer portion projects outwards of the outer ends of the lugs and exposes diamond particles for cutting purposes and being of greater thickness than the lugs and the body and arranged so that its side portions project outwards of the sides of said lugs and expose diamond particles for cutting purposes, the leading or foremost lug being adapted and designed during operation of the saw to absorb shock resulting from engagement with the work and tending to dislodge the cutting part from its seat and also to form a barrier for protecting the front end of said cutting part from being undercut and rapidly worn away by sludge.

3. As a part of a rotary saw of the type that is adapted to cut stone and embodies a comparatively large flat sided disc-like blade with a substantially rectangular radially extending notch in its outer margin; a tooth comprising a substantially flat metallic body of no greater thickness than the blade, shaped conformably to and fitting within the notch, arranged so that it is transversely centered with respect to the sides of the blade, having the outer end surface thereof terminating directly adjacent the outer edge of the blade, and provided at its front outer corner or edge portion with an integral outwardly extending comparatively short metallic lug which defines with said outer end surface of the body an elongated open top and open sided seat outwards of the outer edge of the blade, is of less dimension from front to back than it is high and the seat is long and has the sides thereof flush with the sides of the body, and a single elongated solid block-like cutting part consisting of a metallic matrix and crushed or fragmented diamond particles distributed uniformly throughout the entire matrix, fitting in and extending lengthwise of the seat and having the inner portion thereof fitting against and bonded to said outer end surface of the body and its front end fitting against and bonded to the back of the lug, said cutting part being of greater height than the seat is deep in order that its outer portion projects outwards of the outer end of the lug and exposes diamond particles for cutting purposes, being of greater thickness than the lug and the body and arranged so that its side portions project outwards of the sides of said lug and body and expose diamond particles for cutting purposes, and having front end extensions in lapped and bonded relation with the sides of the lug, said lug being adapted and designed during operation of the saw to absorb shock tending to dislodge the cutting part from its seat and also to form a barrier for protecting said front end of the cutting part from being undercut and rapidly worn away by sludge.

4. As a part of a rotary saw of the type that is adapted to cut stone of particular hardness and embodies a comparatively large flat sided disc-like blade with a substantially rectangular radially extending notch in its outer margin; a tooth comprising a substantially flat metallic body of no greater thickness than the blade, shaped conformably to and fitting within the notch, arranged so that it is in transversely centered relation with respect to the sides of the blade, having the outer end surface thereof terminating directly adjacent the outer edge of the blade, and provided at its leading outer corner or edge portion with an outwardly extending comparatively short metallic lug which defines with said outer end surface of the body an elongated open top and open sided seat outwards of the outer edge of the blade and which is of less dimension from front to back than the seat is long, and an elongated solid block-like cutting part consisting of a metallic matrix and crushed or fragmented diamond particles distributed uniformly throughout the entire matrix, fitting in and extending lengthwise of the seat, having the inner portion thereof fitting against and bonded directly to said outer end surface of the body and its front end fitting firmly against the back of the lug, said cutting part being of greater height than the seat is deep in order that its outer portion projects outwards of the outer end of the lug and exposes diamond particles for cutting purposes and being of greater thickness than the lug and body and arranged so that its side portions project outwards of the sides of said lug and body and expose diamond particles for cutting purposes, said lug being adapted during operation of the saw to absorb shock resulting from engagement with the work and tending to dislodge the cutting part from its seat and also to form a barrier for protecting the front end of said cutting part from being undercut and rapidly worn away by sludge, the metal of which the lug is formed being of such character that the lug, in connection with cutting of the stone by the saw, has substantially the same rate of wear as the diamonds of said cutting part.

5. As a part of a rotary saw of the type that is adapted to cut stone and embodies a comparatively large flat sided disc-like blade with a substantially rectangular radially extending notch in its outer margin; a tooth comprising a substantially flat metallic body of the same thickness as the blade, shaped conformably to and fitting within the notch, arranged so that its sides are flush with the sides of the blades, having the outer end surface thereof terminating directly adjacent the outer edge of the blade, and provided at its outer corner or edge portions with a pair of laterally spaced outwardly extending integral metallic lugs which define with said outer end surface of the body an elongated open top and open sided socket-like seat outwards of the outer edge of the blade, are of less height than the seat is long and have the sides thereof flush with the sides of the body, and an elongated solid block-like cutting part consisting of a sintered metal matrix and crushed or fragmented diamond particles distributed uniformly throughout the entire matrix, fitting in and extending lengthwise of the seat, having the bottom portion thereof fitting against and bonded to said outer end surface of the body and its ends fitting against and bonded to the inner surface of the lugs, said cutting part being of greater height than the seat is deep in order that its outer portion projects outwards of the outer ends of the lugs and exposes diamond particles for cutting purposes, being of greater thickness than the lugs and the body and arranged so that its side portions project outwards of the sides of said lugs and body and expose diamond particles for cutting purposes, and having said side portions provided with end extensions in lapped and bonded relation with the sides of the lugs, the foremost or leading lug being adapted and designed during operation of the saw to absorb shock tending to dislodge the cutting part from its seat and also to form a barrier for protecting the front end of said cutting part from being undercut and rapidly worn away by sludge.

VINCENT J. FANTOZZI.
LEOPOLD H. METZGER.

REFERENCES CITED

The following references are of record in the file of this patent:

UNITED STATES PATENTS

| Number | Name | Date |
|---|---|---|
| 1,939,991 | Krusell | Dec. 19, 1933 |

FOREIGN PATENTS

| Number | Country | Date |
|---|---|---|
| 326,771 | France | June 5, 1903 |
| 15,593 | Great Britain | July 29, 1905 |
| 105,376 | Great Britain | Apr. 10, 1917 |
| 542,054 | Great Britain | Dec. 23, 1941 |